Sept. 27, 1955 G. W. CORNELL 2,718,677
THRESHOLD AND DOOR SEALING CONSTRUCTION
Filed Feb. 23, 1954
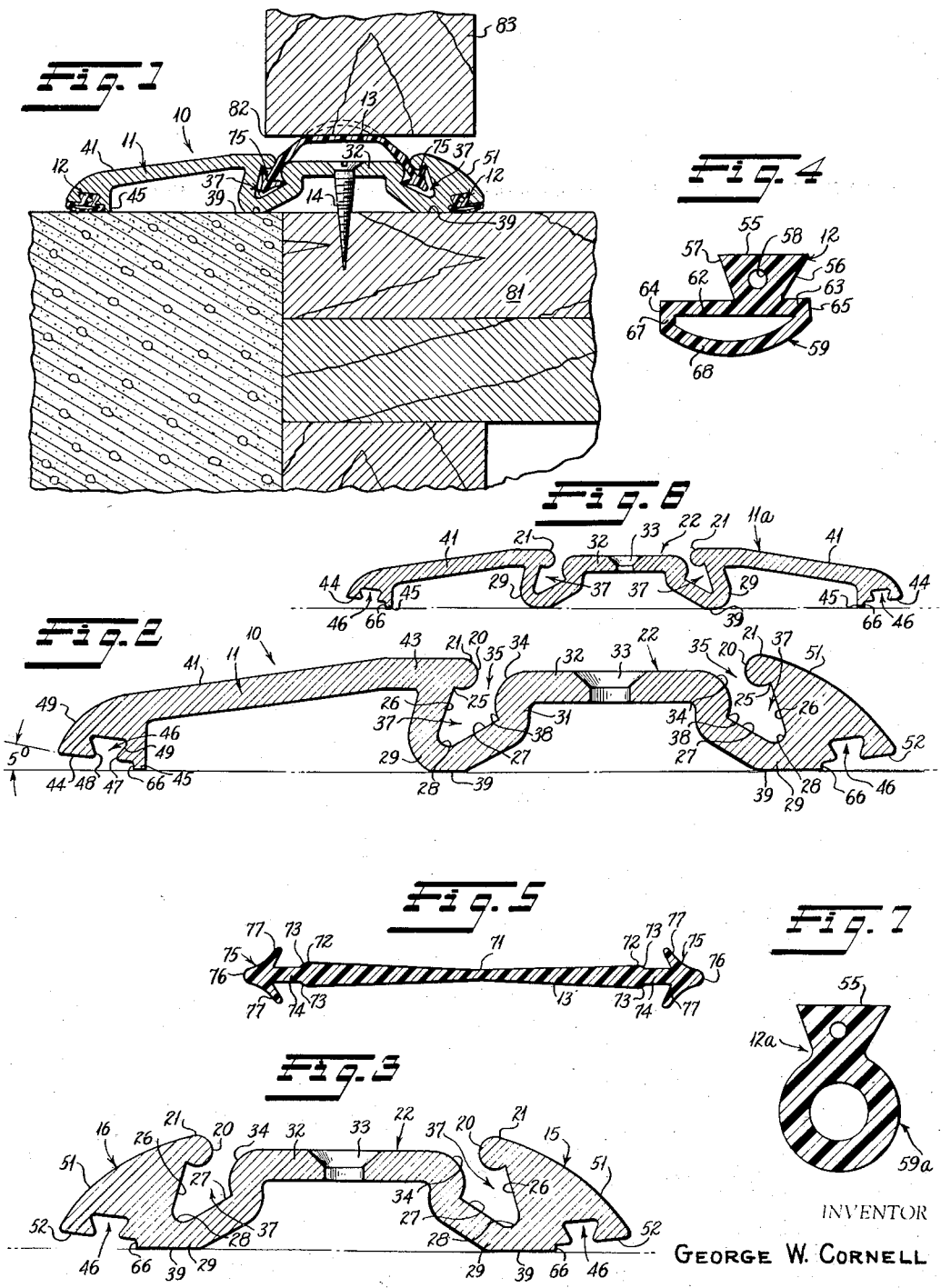
INVENTOR
GEORGE W. CORNELL
BY Strauch, Nolan & Diggins
ATTORNEYS

United States Patent Office 2,718,677
Patented Sept. 27, 1955

2,718,677

THRESHOLD AND DOOR SEALING CONSTRUCTION

George W. Cornell, Miami, Fla., assignor of one-half to W. Elder Cornell, Jr., Miami, Fla.

Application February 23, 1954, Serial No. 411,791

23 Claims. (Cl. 20—64)

The present invention relates to sealing constructions and more particularly to door thresholds and sealing strips to be applied along the two vertical sides and across the top run of the door frame for the purpose of sealing the doorways of buildings against ingress and egress of air and ingress of moisture in event of rain and snow storms.

While various sealing means have been proposed and used in the past to seal doorways and have met with more or less success, none successfully seal sliding or glass doors and usage of these prior art devices over the years has disclosed certain deficiencies and objection particularly when used to seal the doors of modern air conditioned buildings, homes and hospitals, convalescent homes and the like. Examples of some of the various seals heretofore proposed and in use are disclosed by United States Letters Patent to St. Clair, 100,461, dated March 1, 1870; to Holst, 350,931, dated October 19, 1886; to Petit, 794,424, dated July 11, 1905; to Oftedal, 2,108,137, dated February 15, 1938; and Curley, 2,575,657, dated November 20, 1951.

These prior structures fail to adequately seal the doors of air conditioned buildings and buildings having modern glass doors or the space between the floor and the underside of the seal mounting strip, fail to provide a seal strip which is readily replaceable in event of wear or damage, create an objectionable bump hazard militating against use in hospitals, convalescent homes and private homes where the occupants are ill or aged and are either confined to a wheel chair or unable to step over the relatively high threshold resulting from the structures disclosed and embody exposed screw holes which are conducive to leakage of moisture to the underside of the threshold and incident rotting out of the flooring and rotting or rusting of the threshold strip itself. In addition, the most generally used structures, such as that shown in Letters Patent 2,108,137, necessitate a caulking operation during assembly which increases the installation time and expense undesirably, particularly in the present day high labor cost era and are of no practical use on glass doors.

It, accordingly, is a primary object of the present invention to provide a universally usable door sealing structure embodying a support strip and a resilient, deformable sealing member adapted to abuttingly engage an edge of a door and conform to any minor irregularities of the door edge to assure an air and moisture seal of maximum efficiency.

Another important object of the present invention resides in the provision of a door sealing structure embodying a support strip sealingly mounted in position along the door frame opposite the edges of a closed door and a resilient generally flexible deformable sealing member having thickened areas adjacent its longitudinal edges adapted for removable connection to the support strip in a manner to bow the center portion outwardly into the path of the door edge whereby upon closing of the door the bowed portion of the sealing member will be engaged by the edge of the door and deformed to snugly engage the door edge over a substantial transverse area to effectively seal the door edge against ingress and egress of air and ingress of the elements.

A further object of the present invention is to provide the support strip of a door sealing structure made up of the support strip and a removable, arched, resilient deformable sealing strip with mounting screw holes disposed beneath the arched sealing strip thereby shielding the screw holes against exposure to the air and elements.

Still another object of the present invention is to provide the support strip of the preceding object with longitudinally extending generally downwardly and outwardly opening undercut grooves along its opposite lateral edges and mating resilient deformable sealing strips adapted, upon mounting of the support strip in position, to engage the floor and door frame structure surrounding the door opening and seal the longitudinal underside edges of the support strip against ingress of air and moisture between the support strip and floor.

A still further object of the present invention resides in the provision of a door sealing structure for a door opening comprising a shallow support strip having longitudinally extending, upwardly and inwardly opening, laterally spaced undercut grooves and a resilient, deformable sealing strip of a width in excess of the lateral spacing of said undercut grooves and having edge formations along its longitudinal edges adapted to matingly engage in the undercut grooves to secure the sealing strip to the support strip with the central portion of the resilient strip bowed outwardly from the support strip in position to sealingly engage the opposed edge of a door closing the door opening and yet be readily collapsed upon engagement of the bowed sealing strip by the foot of a person or wheel of an object passing over the threshold.

Another object of the present invention is to provide the support strip of threshold door sealing unit comprising a shallow support strip and a resilient deformable sealing strip with oppositely downwardly inclined longitudinally extending marginal portions effective to minimize the resistance to passage of wheeled objects over the threshold.

A further object of the present invention resides in the provision of inexpensive extruded metal support strips for a door sealing structure having novel and highly effective longitudinally extending mounting grooves formed in the top and bottom surfaces each groove being designed to receive a resilient deformable sealing strip therein.

Still another object of the present invention resides in the provision of inexpensive resilient, deformable extruded plastic sealing strips for a door sealing structure having novel and highly effective longitudinally extending securing formations along the opposite edges for removably securing the sealing strips to a support strip mounted in a door opening.

Further objects will appear from the following description when read in conjunction with the appended claims and accompanying drawing wherein:

Figure 1 illustrates a sealing structure made in accordance with this invention applied as a threshold seal for a door;

Figure 2 is an enlarged sectional view detailing the construction of one form of a novel threshold mounting strip forming a part of the door sealing structure of the present invention;

Figure 3 is an enlarged sectional view detailing the construction of one form of a novel door frame mounting strip forming a part of the door sealing structure of the present invention;

Figure 4 is an enlarged sectional view detailing the construction of a preferred form of a novel resilient sealing strip provided by this invention for sealing the underside of the various support strips of the present invention;

Figure 5 is an enlarged sectional view detailing the construction of a preferred form of a novel resilient sealing strip provided by this invention for sealingly engaging the door edges;

Figure 6 is a sectional view detailing the construction of a form of novel threshold mounting strip forming a part of the door sealing structure of the present invention designed particularly for use on inside doors and two way swinging doors of hospital and like buildings where it is desirable to minimize interference to passage of wheeled objects over the threshold; and Figure 7 is a view similar to Figure 4 through a modified undersurface seal strip.

With continued reference to the drawing wherein like parts throughout the several figures of the drawing are identified by the same reference numeral a preferred universal door threshold sealing unit 10 of the present invention is made up of a support strip 11, a pair of underside resilient, deformable seal strips 12, a single resilient, deformable seal strip 13 and a plurality of securing screws 14. The vertical and horizontal seal units 15 for the side and top edges of the doors may be for the most part identical to the threshold seal, the only difference being that a support strip 16 (Figure 3) of different configuration in cross-section lighter construction and smaller dimensions is preferably used in place of support strip 11. The opposite lateral sides of support strip 16 are symmetrical and may correspond in form to the right hand side of theshold strip 11 as viewed in Figures 1 and 2.

Each of these seal unit parts embody novel features, to be more fully hereinafter pointed out, that positively secure the removable sealing strips to the support strips and prevent accidental disassociation of the seal strips from the support strip. The sealing strips are additionally of novel formation and composition to assure efficient sealing of the door opening without harmful injury or wear for long periods so essential to operation and maintenance of modern air conditioned buildings. These seals also are designed for universal use so they can be employed irrespective of the type of door to be sealed and the nature of the construction of the building's floors and walls as will presently appear.

Referring further to support strip 11, this strip is preferably formed of a rust and corrosion resistant metal, such as aluminum. For economy in manufacture, the strip 11 is preferably formed as a metal extrusion in well known manner. To adapt the strip for threshold use and avoid any appreciable bump hazard in use, the strip 11 in cross-section is designed so that the overall width is 3½ inches and the overall height is .477 inch at points 21 (Figure 2) approximately one-half inch to either side of a longitudinal axis disposed 1.187 inches in from one edge. The area between points 21 is recessed as indicated by numeral 22 to a height of approximately .4 inch so that the flexible sealing strip 13 may be depressed into the recess 22 when engaged by an object passing over the threshold. The strip 11 in cross-section is of a shape to assure adequate structural strength to resist deformation in general use and at the same time provide novel mounting grooves 46 and 37 for receiving sealing strips 12 and 13.

To secure this structural strength and groove formation, the portion of strip 11 facing inwardly from points 21 is rounded off as indicated at 20 and intersects at 25 an outwardly and downwardly inclined wall 26 to form a locking shoulder. Wall 26 together with an opposing inwardly diverging wall 27, joined at the intersecting ends by a curved transition area 28, define oppositely angularly related, hollow, longitudinally extending structural strengthening ribs 29. Ribs 29 at the upper ends of walls 27 intersect a vertical wall section 31 the upper ends of which integrally join a horizontally disposed bridge portion 32 which defines the bottom of recess 22 and is suitably drilled at longitudinally spaced points as indicated at 33. The opposite ends of bridge portion 32 are rounded off as indicated at 34 and cooperate with the respective adjacent rounded portions 20 to define restricted longitudinally extending entrance ways or mouths 35 leading into the interior grooves 37 of ribs 29.

While the particular angular disposition of ribs 29 may be varied, it has been determined that a suitable general arrangement is to have walls 26 and 27 disposed to define an included angle of 45° and the inclination of a plane bisecting this 45° angle inclined inwardly at an angle of 37° from the perpendicular. A suitable mouth opening 35 is of the order of .094 inch when used with a sealing strip 13 of the character to be hereinafter described. These angular relationships and mouth dimensions when employed with a metal strip having a wall thickness generally of .125 inch and the rounded portions 20 and 34 respectively formed on radii of .062 inch and .125 inch provided internal locking shoulders 25 and 38 spaced apart a distance of approximately .250 of an inch the depth of recesses 37 being about .218 of an inch measured from a transverse plane through the intersection of locking shoulders 25 and 38 with walls 26 and 27.

This basic supporting structure may be variously formed outwardly from points 21 as will be clear from an inspection of Figures 2, 3 and 6 of the drawings to meet varying conditions of use. Figure 2 shows one form of threshold particularly adapted for external door use with a conventional inwardly or outwardly opening door as illustrated in Figure 1 of the drawings. Figure 3 illustrates a supporting strip useful along the vertical and top door edges. While such a strip may take any desired form and may eliminate strips 12, the design of Figure 3 merely duplicates on each edge the formation of the right hand portion of Figure 2. Of course, the dimensions and thickness will be reduced in actual use since the side and top strips are not subjected to the loads and rough usage of the thresholds. Figure 6 illustrates a support strip particularly adapted for use as a threshold on interior doorways or external doorways of the two way swinging type most commonly used in hospitals and modern air conditioned building entryways. This design merely duplicates on each edge the formation of the left hand side of Figure 2.

In all forms of the support, the basic structure just described is the same. Therefore, the significant reference numerals to establish identity only have been applied in Figures 3 and 6. All forms of the support strip are also formed with longitudinally extending planar surfaces 39 on the underside of ribs 29 which, when the strip is properly secured in place, firmly rests on the floor or door frame structure to secure the support strips against undesired tilting movement in use.

To better adapt the threshold units for hospital, convalescent home and like use where wheelchair invalids must pass over the threshold, the present invention contemplates an inclined approach lip 41 of .125 inch thickness at one (Figure 2) or both (Figure 6) sides of the threshold support strips 11 and 11a. In the case of an external door of the conventional inwardly opening type, the threshold of Figure 2 with its approach lip 41 disposed exteriorly of the building would preferably be employed. This assures a finished appearance interiorly of the door substantially in line with the inner door face so a rug or carpet can be conveniently laid close up to the door.

Whether a single or double approach lip is used, the structure of each is the same. The detailed description given here will therefore, be directed primarily to Figure 2. As will clearly appear from Figure 2, the approach lip 41 is inclined downwardly at an angle of 8° from the horizontal starting at a point spaced outwardly from point 21 a distance of about .375 inch. The upper end of lip 41 is integrally connected to the upper end of wall 26 of rib 29 by a horizontally extending portion 43, the upper surface of which is tangentially disposed with respect to the uppermost point of the rounded portion 24.

At its free end, the upper surface of lip 41 merges into a sharply downwardly curving section formed on a radius of .375 inch. This curving section terminates at a point above the plane of planar surfaces 29 determined by intersection with an inwardly and downwardly inclined surface 44 the inner edge of which is provided with a longitudinally extending floor engaging rib 45 the inner edge of which is .375 inch inwardly from the point of intersection of surface 44 and the downwardly curving section of the upper surface of lip 41 and the depth of which is .040 inch measured from surface 44.

As clearly seen from Figure 2, the floor engaging face of rib 45 lies in the plane of surfaces 39. While the slope of surface 44 may be varied as desired, it has been found desirable that the inclination by 5° to the horizontal as shown in Figure 2 in order to best adapt the strip for reception of the undersurface seal strip 12.

Surface 44 is adapted to receive seal 12 by formation therein of an inwardly directed groove 46 having a mouth opening 47 of a width of .112 inch at surface 44. Groove 46 is of a depth of 0.93 inch and is of generally dovetail configuration in cross-section. The opposite sidewalls 48 and 49, however, are differently inclined, wall 48 being inclined 20° to a plane normal to surface 44 and wall 49 being oppositely inclined at an angle of 30° to such a plane. The surface 44 preferably extends inwardly to a point such that the width of rib 45 will be .062 inch.

The edge 51 of strip 11 opposite lip 41 is shaped to provide an ornamental finished appearance and is of substantial mass to withstand blows in use and the rigors of the elements. This type of edge in addition to being used as the exteriorly exposed edge of a threshold is also particularly effective because of its mass and shape for use on both edges of support strips 16 to impart a pleasing finished appearance thereto and withstand the knocks and bumps which are likely to occur because of objects passing through the doorway.

Edge 51 is formed by a curving surface having a radius of .875 inch tangentially merging into curved portion 20. This curving surface terminates at a point above the plane of planar surfaces 39 determined by intersection with an inwardly and downwardly inclined surface 52 identical to inclined surface 44 of lip 41. As clearly seen from Figure 2, surface 52 is intersected by a groove 46 similar in all respects to groove 46 previously decribed. While surface 52 extends inwardly to the same extent as surface 44, it will be noted that rib 45 is omitted at this edge since surface 39 takes the place of rib 45 here.

From the foregoing description, it will be apparent that critical features of all the support strips of this invention are (1) the particular location of the securing screw holes in bridge 32, (2) the inwardly inclined undercut grooves 37 for mounting the seal strips 13, (3) the inclined surfaces 44 and/or 52 with their dovetail shaped grooves 46 for mounting the seal strips 12 and (4) the bottoming surfaces 39 and/or rib 45 for engaging the floor or door frame surfaces to assure rigid mounting of the support strips. While seal strips 12 and 13 may be variously shaped so long as an adequate interlock with the support strips is obtained, it will be appreciated that flexibility, long life and resiliency of the seal strips and an ability to replace damaged strips 13 without completely dismantling the sealing units is essential for practical success of this invention.

The present invention accomplishes these desired ends by providing sealing strips of soft, durable, flexible and resilient material, such as vinyl plastic, natural rubber or rubber-type plastics similar to vinyl plastics. Tests to date indicate that vinyl type plastics are particularly suitable because of their long life properties and immunity to damage when constructed as hereinafter described to impart the desired flexibility at desired points and relatively lesser flexibility and greater mass at other points and their excellent resistance to deteriorating effects of weather and effective operation even under cold climate conditions.

Referring first to seals 12 for use in grooves 46 to seal the undersurface of support strips 11, 11a and 16 in lieu of the present unsatisfactory caulking practices, an extruded vinyl plastic strip of indeterminate length having a cross-sectional configuration as shown in Figure 4 has been found particularly effective where the floor lines at either side of the door are at the same level. As appears from Figure 4, seal strip 12 has a base portion 55 of generally dovetail configuration. Like grooves 46 in which this seal is mounted, the inclined wall 56, which matingly engages recess wall 49, is inclined at an angle of 30° to a plane normal to the plane of the bottom of base 55. Wall 57, which matingly engages recess wall 48 is inclined at an angle of 20° to the same plane. The transverse dimension of base 55 at its smaller end is .093 inch, just .009 of an inch less than the transverse dimension of mouth 47 of grooves 46, and the depth of the dovetail base 55 is .093 inch to assure a close fit of the seal strip 12 in grooves 46. A ⁹⁄₆₄ inch longitudinally extending opening 58 is formed in base 55 of seal strip 12 for a purpose to be presently pointed out.

Base 55 at its smaller end integrally carries a hollow sealing or bulb section 59 including transverse alined wall sections 62 and 63 of ¹⁄₃₂ inch thickness extending respectively away from walls 57 and 56. These two wall sections together have a span of ⁵⁄₁₆ of an inch in the disclosed embodiment wall 62 terminates at 64 at a distance of .203 inch from the nearest point of opening 58 to provide a long wall section adapted to lie along the longer portion of surface 44 of the support strip with which it is associated. The shorter wall section 63 is adapted to lie along the inner short section of surface 44 of the support strip and its end wall 65 slants outwardly in a direction away from base 55 at an angle of 5° from a longitudinal plane normal to the wall section 63 so as to snugly engage the adjacent wall 66 of the support strip.

Bulb section 59 of strip 12 is completed by right angularly disposed end wall 67 and an outwardly arched wall 68 spaced from wall 62 at one end by end wall 67 and joining wall 63 at its other end. The latter end of wall 68 forms a continuation of sloping end wall 65. In the illustrated embodiment of the invention, the points of intersection of the exposed faces of end wall 67 and sloping wall 65 with the exposed face of arcuate wall 68 are respectively ¹⁄₁₆ of an inch and .040 of an inch away from the exposed faces of walls 62 and 63 and the radius of arched wall 68 measured from these points of intersection is ¹⁵⁄₆₄ of an inch.

Assembly of seal strip 12 in the groove 46 of a selected support strip can be best effected by cutting a length of seal strip 12 equal in length to the support strip with which it is to be associated, inserting the longitudinal corner of seal strip base 55 formed by the inclined wall 56 and the base end wall into groove 46 with wall 56 facing wall 48 of groove 46, aligning the ends of the severed section of strip 12 with the ends of groove 46, then pressing the blunt end of a thin bladed tool against the wall 57 of seal strip 12 to force the other corner of base 55 through groove mouth 47 into groove 46 and finally pressing the base 55 into groove 46 by pressure applied to bulb section 59 directly over the base. While the overall width of base 55 at all points back from its smaller end exceeds the width of groove mouth 47, the longitudinally extending opening 58 in strip 12 allows the material of base 55 to be deformed inwardly as the edge of mouth 47 formed by the intersection of wall 48 and surface 44 progressively engages successive sections of strip wall 57.

Once the seal strips 12 are in place, the close fit between dovetail base 55 and mating groove 46 prevent respective longitudinal sliding movement of strip 12 and its support strip and withdrawal movement of base 55 through groove mouth 47. However, in event of damage to bulb section 59 at any time after assembly, strip 12 can be torn or cut out for insertion of a new strip.

Assuming a desired threshold strip 11 or 11a or vertical or top seal strip has been fitted with seal strips 12, installation of the fitted support strip in a door opening is an extremely simple operation. It consists in placing the fitted support strip in place along the side of the door opening to be sealed and inserting the appropriate securing screw 14 through screw holes 33 and screwing them home in the floor structure. If a metal door frame is involved, drilling of the frame through screw holes 33 to adapt the frame to receive a self threading screw would be necessary unless the frame as installed was provided with appropriately located screw holes. The home position of the securing screws is readily determined by bottoming of surfaces 39 and rib 45 on the floor.

If a sliding door is involved, the threshold and top seal strips should extend sufficiently beyond the door opening to assure that the door in its wide open position would still cover a substantial portion of the strip so as not to engage an edge of seal strip 13 and tear it out.

Referring to Figure 1, it will be seen that bulb sections 59 of seal strips 12 are fully collapsed when the support strip is screwed down to its home position. Due to the upward and outward slope of surface 44, it will be appreciated that the inner end of bulb section 59 adjacent seal strip wall 65 first engages the floor. Accordingly, as screws 14 are screwed home drawing the support strip toward the floor or door frame the material of deformable but resilient and highly flexible bulb section 59 rolls or is crowded outwardly automatically conforming to minor floor irregularities to assure adequate sealing of the undersides of the exposed support strip edges. Customary caulking of the under-surfaces of the support strips with its inherent deficiencies in both application and use is, accordingly, wholly eliminated.

In event the floors at either side of the door are of different character, for example one a hardwood floor and the other a cement or terrazzo floor, it is likely that there will be a substantial difference in the plane of the floor lines and in various areas of the cement or terrazzo floors. In such cases the shallow bulb formation of strips 12 have been found to ineffectively seal the lower floor, usually the irregular cement or terrazzo floor. To meet this situation, the present invention provides undersurface seal strip 12a (Figure 7) having a base 55 exactly like that of seal strip 12 and a generally cylindrical bulb section 59a the wall section of which is heavier than the wall section of bulb section 59. As will be clear from Figure 7, the dimensions of bulb section 59a in a vertical plane normal to the base end wall is substantially greater than that of bulb section 59. With seal strip 59a in the groove 46 overlying the cement or terrazzo floor, tightening of screws 14 spaced along strip 11 to varying degrees may be resorted to to compress certain portions of bulb section 59a to varying degrees so the heavy walled bulb section 59a will effectively sealingly engage the floor having major irregularities at all points and itself provide a sufficiently rigid support for the adjacent edge of strip 11 even though its support surface 39 does not rest on the floor.

The primary seal strip 13 is assembled in its grooves 37 as the final installation step so as to cover bridge 32 and the heads of the securing screws 14. Since this strip is subject to severe shear forces upon opening and closing of the door and passage of persons and objects through the doorway, particular care is required to assure it of a long wear life and adequate anchorage in grooves 37 while still providing for its assembly with the support strips in place. In the present invention, this is accomplished by forming strip 13 as a continuous extrusion from material of the character heretofore mentioned in connection with strips 12. In this connection, the vinyl material previously mentioned has exhibited surprising resistance to abrasion and damage having undergone in a test set up some 74,000 door openings and closings (estimated as equivalent to 20 years' usage) without the slightest sign of damage or wear. At each 1000 closings abusive conditions likely to be encountered in use from sand, mud, oil and the like were duplicated to determine the effects. Performance was in no way impaired. The particular suitability of this plastic material for this sealing use will, therefore, be apparent.

This same test, employing the groove structure 37 heretofore described and shown in the drawings of this application and the seal strip structure about to be described, also demonstrated the suitability of the anchoring means of this invention, for no sign of loosening or disassembly of the seal strip 13 was noted in this test.

In order to meet this anchoring problem strip 13 is formed as an integral one piece structure having a body portion of progressively increasing thickness in both lateral directions from a longitudinally extending central area 71 of minimum thickness to symmetrically laterally spaced areas 72 of maximum thickness. As clearly seen in Figure 5, the strip 13 outwardly of areas 72 is symmetrically inwardly reduced in thickness along an arcuate path to provide oppositely facing rounded shoulders 73 terminating in sharp corners at opposed points of intersection with short laterally extending neck sections 74 of uniform thickness provided at their free ends locking formations 75. Locking formations 75 are adapted to be interlockingly received in grooves 37 of the support strip and comprise rounded entry noses 76 and oppositely extending, wing-like locking tabs 77. Tabs 77 are tapered in cross-section from their junction with neck portions 74 and noses 76 to their free ends and incline toward the rounded shoulders 73. The surfaces of tabs 77 facing shoulders 73 are planar in form and join necks 74 in a rounded corner. The opposite faces of tabs 77 are concavely curved to smoothly merge into noses 76 so that upon entry of noses 76 into the grooves 37 of the support strips the rounded portions 20 and 34 defining the entryway of grooves 37 will slidingly engage tabs 77 and bend the tabs inwardly into the opposed recesses formed by neck portions 74.

To assure an effective interlock between locking formations 75 and grooves 37, the nose portions 76 of strip 13 and neck portions 74 are dimensioned to be a few hundredths of an inch smaller than the mouth opening of grooves 37. As a consequence, entering movement of tabs 77 into grooves 37 necessitates use of the blunt thin tool to force the tabs through the mouth opening of grooves 37. Once inside grooves 37, the compressive forces on tabs 77 spring out to their normal position in locking engagement with locking shoulders 25 and 38. Retrograde movement of locking formations 75 to remove sealing strip 13 hopelessly bunches the ends of tabs 77 alongside of neck portions 74 with the result that the strip 13 can only be removed by tearing one end of strip 13 out of the grooves with ordinary pliers and thereafter easily peeling out the rest of the strip by hand.

In a particular application of the invention found to be particularly effective the minimum width of strip 13 at 71 is .046 of inch, the maximum width at 72 is .090 inch, the dimensions of the neck portions 74 and noses 76 is .062 inch, the span of the tabs is .234 inch and the overall width of the strip is 1²⁰⁄₃₂ inches. The grooves 37 mating with this strip have a mouth opening of .094 of an inch with the locking shoulder span being .250. It will, therefore, be appreciated that tabs 77 have a substantial overlap behind the rounded portions 20 and 34 of the support strip.

As a result of the particular design and dimensions of seal strip 13, it assumes a normal arched position such as indicated by the dotted lines in Figure 1 when finally mounted in support strip grooves 37. Accordingly, when a threshold unit 10 is mounted in operative position on a building floor 81 as shown in Figure 1 of the drawings, the corner 82 of door 83 in swinging to closed position first strikes arched seal strip 13 the upper ⅛ inch of the side facing inwardly of the building. As the door continues to move to closed position, it tends to push the arched strip bodily toward the outer face of the door opening and applies a substantially lengthwise pull to the locking formation 75 in the indoor groove 46. At the same time, the rounded shoulder 73 at the opposite end of seal strip 13 is pressed against the adjacent rounded portion 20 of support strip 11 resisting outward movement of strip 13. Since no bodily movement of seal strip 13 is possible and as the strip is resiliently flexible as door corner 82 moves across it and firmly bears against the door edge over a wide area as shown in Figure 1. This wide area seal coupled with the resilient flexibility of the seal assures a good airtight seal irrespective of surface imperfections in the door edge. It has been found that strips made of vinyl plastic when used to seal a door having badly cut, unsanded, irregular, unpainted and unleveled bottom edges are self-adjusting, first wearing rapidly at points but then, after adjustment to the abusive conditions, discontinuing further wear and continuing in use through 69,000 door closings without further indication of wear.

To assure greater ease of closing a door provided with the threshold of this invention, it has been found desirable to bevel the door bottom from face to face in the direction of closure from ⅛ to 3/16 of an inch. This results in a better sealing action with less wearing-drag on strip 13.

A further noticeable advantage of this threshold strip is its dampening action upon closing of the door to eliminate much of the slamming noises. Also the effective sealing of the metal support strip along its edges as clearly seen in Figure 1 and the smoothly curving contour of the resulting edges permits dirt to be swept up and over the threshold with ease. As a consequence, the threshold of this invention does not provide crevices along the edges for trapping dirt and food particles like the thresholds now in use thereby providing better sanitation and eliminating a source of attraction for ants and other insects.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An article of manufacture in the form of a unitary assembly for use as a sealing structure for a door opening comprising an elongated support strip having laterally spaced, longitudinally extending, undercut grooves opening through its upper surface and providing locking shoulder formations and also having longitudinally spaced through fastener openings located between said grooves for receiving securing elements for attaching said support strip in place in a door opening; and an elongated resilient and deformable sealing strip of a width exceeding the lateral spacing of said undercut grooves and having its opposite longitudinal edges in the form of locking formations comprising upstanding inwardly inclined longitudinally continuous tabs disposed in said undercut grooves in mating interlocking engagement behind said locking shoulder formations thereby securing the sealing strip to said support strip in arched covering relation to the portion of said support strip between said grooves in position to engage the adjacent edge of a door closing said door opening and prevent the passage of air and moisture between said door and said sealing structure and into said fastener openings when said sealing structure is mounted in said door opening.

2. The combination defined in claim 1 wherein said support strip is a rust and corrosion proof metal strip and said sealing strip is a one piece vinyl plastic strip the opposite side edges of which outwardly of said tabs are in the form of rounded entry noses merging smoothly into said tabs.

3. The combination defined in claim 1 wherein the underside of said support strip adjacent its opposite longitudinal edges is provided with longitudinally extending undercut locking grooves and elongated resilient and deformable sealing strips having mounting bases formed to interlockingly engage in said last mentioned locking grooves are removably secured in said last mentioned locking grooves with their sealing portions projecting away from said support strip for sealing engagement with the surrounding surfaces defining said door opening.

4. The combination defined in claim 3 wherein the sealing portions of the underside sealing strips comprise a collapsible bulb section of transversely elongated configuration having an arcuate wall arranged to assure a first abutting engagement of its most inwardly disposed area with the surfaces defining said door opening and adapted, upon tightening of said fastening elements and movement of said support strip toward said surfaces defining said door opening under influence of said fastening elements, to force the excess material of said bulb section resulting from its collapse outwardly toward the exposed support strip edges whereby upon final tightening of said fastening elements the space beneath the edge areas of said support strip will be most effectively sealed against ingress of air and moisture.

5. As an article of manufacture a support strip for a door sealing unit comprising an elongated rigid strip having on one face thereof hollow, rib-like, longitudinally extending, formations located inwardly from the lateral edges of said strip and opening through the other face to provide inwardly inclined, longitudinally extending mouth openings of substantially lesser width than the cross-sectional width of the hollow interior of said rib-like formations whereby inwardly shouldered laterally spaced, longitudinally extending, seal strip mounting grooves adapted to interlockingly mount the opposite longitudinal edges of a main flexible and deformable door seal strip are provided, means in said strip between said rib-like formations for securing said support strip in a door opening with said rib-like formations supporting said strip in position in said door opening, and strip edge extensions disposed outwardly of said rib-like formations to provide a finished appearance to the upper edges of said strip and having outwardly inclined, longitudinally extending undercut mounting grooves opening through the lower concealed edges of said strip adapted to interlockingly mount flexible and deformable undersurface seal strips therein.

6. The combination of claim 5 wherein the strip edge at one side at least comprises an outwardly and slightly downwardly inclined, longitudinally extending lip of substantial transverse width terminating at its outermost end in a depending, longitudinally extending hollow, rib-like formation, of substantially lesser height than said previously mentioned supporting rib-like formations, having a transversely restricted entrance opening in its lowermost face cooperating with the hollow interior to provide the mounting groove for the flexible and deformable undersurface seal strip, said lip providing an approach surface inclined upwardly from approximately floor level to the maximum height of said support strip whereby easy passage of wheeled objects across said door sealing unit is assured.

7. The combination defined in claim 5 wherein the strip edge at one side at least comprises an outwardly and downwardly curved longitudinally extending surface intersecting at its lower end an upwardly and outwardly inclined planar surface extending outwardly from the adjacent longitudinally extending, hollow rib-like formation and interrupted between its ends by the restricted mouth opening of a longitudinally extending downwardly and outwardly inclined undercut groove forming the mounting groove for the flexible and deformable undersurface seal strip at said one edge.

8. A flexible and deformable seal strip for use as the door sealing element of a door sealing strip comprising a vinyl plastic longitudinally extending body section of substantial width having along its opposite edges upstanding locking formations and body areas of maximum thickness spaced inwardly from said lateral edges.

9. The combination defined in claim 8 wherein the body section is of minimum thickness along its longitudinally extending center portion, increases progressively in thickness to a point spaced inwardly from said locking formations where it merges into laterally extending areas of reduced thickness through convex arcuate areas providing rounded abutment shoulders.

10. The combination defined in claim 9 wherein said locking formations comprise tabs inclined slightly inwardly toward said body section but spaced throughout their length from said laterally extending areas of reduced thickness adapting said tabs for ready inward compression upon insertion into suitably formed mounting grooves provided to secure said sealing strip in a door opening.

11. An article of manufacture in the form of a unitary assembly for use as a door seal unit comprising a support strip of preselected length having on one face thereof hollow, rib-like, longitudinally extending, support formations located inwardly from the lateral edges of said strip and opening through the other face to provide inwardly inclined, longitudinally extending mouth openings of substantially lesser width than the cross-sectional width of the hollow interior of said rib-like formations whereby inwardly shouldered laterally spaced, longitudinally extending, seal strip mounting grooves adapted to interlockingly mount the opposite longitudinal edges of a main flexible and deformable door seal strip are provided, means in said strip between said rib-like formations for securing said support strip in a door opening with said rib-like formations supporting said strip in position in said door opening, and strip edge extensions disposed outwardly of said rib-like formations to provide a finished appearance to the upper edges of said strip; and a sealing strip comprising a vinyl plastic longitudinally extending body section of greater width than the lateral spacing between said undercut seal strip mounting grooves having oppositely laterally extending attachment formations including interlock shoulders of maximum thickness secured in said mounting grooves behind the shoulders of said mounting grooves to removably mount said seal strip in arched assembled relation between said mounting grooves.

12. The combination defined in claim 11 wherein the maximum height of said support strip is of the order of .477 inches and at least one lateral edge is provided with a laterally directed extension of substantial lateral width and relatively slight downward inclination the outermost end of which is of a height substantially less than said maximum height whereby passage of wheeled objects thereover may be readily effected.

13. The combination defined in claim 12 wherein the underface of said extension adjacent its outermost end is provided with a dovetail groove extending longitudinally therealong and a vinyl plastic seal strip composed of a longitudinally extending bulb section having a longitudinally extending dovetail base matingly engaged in said dovetail groove is provided to seal the underface of said support strip extension against ingress of air and moisture.

14. An article of manufacture in the form of a unitary assembly for use as a sealing structure for a door or like opening comprising a one piece metal support strip of a width substantially equal to that of the door or like opening and having one face which includes abutment surfaces for abutting engagement with the exposed face of the framing defining the door or like opening and an opposite face which includes means in the form of at least one longitudinally extending, undercut groove opening through said other face and providing along its respective longitudinal edges opposed locking shoulder formations; and an elongated resilient and deformable sealing strip having a longitudinally extending sealing portion, a pendant longitudinally extending support portion of relative slight width in cross-section, and locking formations on said support portion extending in opposite directions from the longitudinal side faces of said support portion to form laterally opposed portions of greater cross-sectional width than said support portion disposed in said undercut groove in mating interlocking engagement behind said locking shoulder formations to removably secure said sealing strip to said support strip whereby upon mounting of said sealing structure in a door or like opening the adjacent edge of a door or the like closing said door or like opening will engage and deform the sealing portion of said sealing strip thereby sealing the door or like opening against ingress or egress of air and moisture.

15. An article of manufacture in the form of a unitary assembly for use as a door threshold or the like comprising a one piece rigid support strip of generally arch shape configuration in cross-section having depending longitudinally extending reinforcing ribs along its under face, longitudinally extending abutment surfaces along its opposite edges adapted to engage the floor surface of a doorway opening along laterally spaced areas and longitudinally extending undercut groove means in its upper face; and an elongated sealing strip comprising a longitudinally extending attachment section matingly engaged in said groove means and removably securing said sealing strip to said support strip and an integral sealing section comprising a relatively thin arch-like resilient and deformable wall protruding above and spanning a portion of said upper face of said support strip in position to engage the under edge of a closed door mounted in said doorway opening and be depressed thereby to form a continuous air and moisture tight seal from end to end of said door edge.

16. An article of manufacture in the form of a unitary assembly for use as an air and moisture tight door threshold comprising a generally arch shaped metal support strip of substantial length having a central planar section, oppositely directed downwardly and outwardly inclined approach sections formed adjacent their free lateral edges with downwardly facing abutment surfaces adapted to abuttingly engage the floor surface of a doorway opening, a pair of laterally spaced, longitudinally extending reinforcing ribs depending from the underside of said support strip along the line of juncture of said central planar section and said oppositely directed approach sections, at least one of said ribs forming a longitudinally extending, upwardly facing undercut groove means at one side of said central planar section; and an elongated seal strip having a portion complementarily formed to matingly engage said groove means and secure said sealing strip to said support strip in position to sealingly cooperate with the lower edge of a door provided to close said doorway opening comprising a longitudinally extending, transversely arched, wall-like, section of resilient and deformable material protruding above the plane of said central, planar section and a mounting section anchored in said undercut groove means.

17. A flexible and deformable seal strip for use as a sealing element in a door threshold assembly or the like comprising a longitudinally extending support section of deformable material having a substantial cross-sectional area and a relatively thin, wall-like sealing section of deformable material transversely arch shaped in configuration and longitudinally coextensive with said support base and having its lateral edges integrally joined to said support section through a section of reduced cross-sectional area, said arch like wall section being adapted to abut against an opposing surface and form an intimate contact therewith along a longitudinally continuous area to effectively prevent ingress and egress of air and moisture between said opposing surface and said sealing section.

18. An article of manufacture in the form of a unitary assembly for use as a self-sealing door threshold assembly comprising an elongated support strip having integral interlock means extending longitudinally along one face and laterally outwardly and downwardly directed, longitudinally extending marginal portions the under faces of each of which adjacent the lateral edges are provided with integral interlock means; an elongated resilient and deformable sealing strip secured in said first mentioned interlock means and having a portion extending away from said one face in position to sealingly engage the lower edge of a door upon mounting of said threshold in the doorway opening; and an elongated resilient and deformable sealing strip secured in the interlock means of each of said marginal portions and having a portion extending away from the under faces thereof whereby upon mounting of said threshold in said doorway opening said last named sealing strips will engage the doorway surface covered by said threshold along laterally spaced areas to prevent passage of air and moisture under said threshold from either lateral edge thereof.

19. An article of manufacture in the form of a unitary assembly for use as a seal for wall openings comprising an elongated, rigid, support strip having a pair of laterally spaced, longitudinally continuous, undercut seal securing grooves in its front face and a back face having abutment surfaces spaced outwardly beyond said groove means and adapting said support strip to be mounted in said wall opening along an edge thereof in opening defining position with said front face directed inwardly of said wall opening; resilient and deformable seal means removably secured to said support strip comprising a securing portion along each lateral edge interlockingly engaged in a respective groove and a seal portion having a lateral dimension related to the spacing of said securing grooves so as to be bowed outwardly to form a resilient and deformable wall portion for sealingly engaging an opposed edge of a closure member mounted to close said wall opening; and fastening receiving means adapted to receive fasteners for securing said support strip in position along a selected side of said wall opening with said resilient and deformable wall portion extending into said wall opening into the path of the opposed edge of said closure member so as to effect a peripheral sealing engagement with said closure member disposed in closing relation in said wall opening.

20. The combination defined in claim 19 wherein said wall portion of said seal means and said securing portion along each lateral edge are joined by a neck portion of substantially reduced thickness and the opposed thicker areas adjacent each end of said neck portion are disposed in overlapping opposed relation to the groove defining edges of said support strip to respectively prevent movement of said wall portion into said grooves and movement of said securing portion out of said grooves.

21. As an article of manufacture a support strip for a door, window or like sealing unit comprising a one piece elongated rigid strip having on one face thereof hollow, rib-like, longitudinally extending formations located inwardly from the lateral edges of said strip and opening through an upper inner corner to provide inwardly inclined, longitudinally extending mouth openings of substantially lesser width than the cross-sectional width of the hollow interior of said rib-like formations and forming therewith internally shouldered laterally spaced, longitudinally extending, seal strip mounting grooves adapted to interlockingly mount the opposite longitudinal edges of a flexible and deformable closure member seal strip; and means adapting said rigid strip for attachment in a door or like wall opening with said mouth openings opening toward the center of said wall opening.

22. The support strip of claim 21 wherein said lateral strip edges beyond said rib-like formations extend away from the face of said main body of said support strip opposite that in which said mouth openings are formed to provide a finished appearance to the upper outer edges of said support strip and terminate at their dependent free ends in enlarged, hollow, rib-like formations having longitudinally extending mouth openings of substantially lesser width than the cross-sectional width of the hollow interiors thereof forming therewith internally shouldered, longitudinally extending, seal strip mounting grooves adapted to interlockingly mount wall opening seal strips.

23. A flexible and deformable seal strip for use as a closure member sealing element in a wall opening sealing assembly comprising a longitudinally extending resilient and deformable plastic body section of substantial width having along its opposite lateral edges laterally extending necked-down portions terminating at their free ends in longitudinally extending enlarged interlock formations.

References Cited in the file of this patent

UNITED STATES PATENTS

| | | |
|---|---|---|
| 100,461 | St. Clair | Mar. 1, 1870 |
| 2,070,725 | Gail | Feb. 16, 1937 |
| 2,102,578 | Gail | Dec. 14, 1937 |
| 2,108,137 | Oftedal | Feb. 15, 1938 |
| 2,575,657 | Curley | Nov. 20, 1951 |